United States Patent
McLauchlan et al.

(10) Patent No.: US 8,226,893 B2
(45) Date of Patent: Jul. 24, 2012

(54) AUTOMATED SULFUR RECOVERY LOOP

(76) Inventors: Robert A. McLauchlan, Austin, TX (US); Frederick J. Siegele, Austin, TX (US); Daniel Hage, Paducah, KY (US)

(*) Notice: Subject to any disclaimer, the term of this patent is extended or adjusted under 35 U.S.C. 154(b) by 536 days.

(21) Appl. No.: 12/209,202

(22) Filed: Sep. 11, 2008

(65) Prior Publication Data

US 2009/0317316 A1 Dec. 24, 2009

Related U.S. Application Data

(60) Provisional application No. 61/075,231, filed on Jun. 24, 2008.

(51) Int. Cl.
 G05D 16/00 (2006.01)
 G05B 1/00 (2006.01)
 B01J 8/00 (2006.01)
 B01J 10/00 (2006.01)
 B01J 19/00 (2006.01)
 B01D 53/34 (2006.01)

(52) U.S. Cl. ........ 422/110; 422/105; 422/111; 422/129; 422/168; 422/187; 422/600; 422/601; 422/630

(58) Field of Classification Search ............... 422/168, 422/169, 129, 187, 600, 601, 630
See application file for complete search history.

(56) References Cited

U.S. PATENT DOCUMENTS

| | | | | |
|---|---|---|---|---|
| 4,049,399 A * | 9/1977 | Teller | | 95/36 |
| 4,210,627 A * | 7/1980 | Verloop et al. | | 423/220 |
| 4,948,402 A * | 8/1990 | Davis | | 96/290 |
| 5,667,651 A * | 9/1997 | Bryan | | 204/401 |
| 5,718,872 A * | 2/1998 | Khanmamedov | | 422/168 |
| 6,365,099 B1 * | 4/2002 | Castrantas et al. | | 422/5 |
| 2005/0274256 A1 * | 12/2005 | Davis et al. | | 95/199 |
| 2007/0180802 A1 * | 8/2007 | Parker et al. | | 55/485 |

* cited by examiner

Primary Examiner — Walter D Griffin
Assistant Examiner — Natasha Young
(74) Attorney, Agent, or Firm — Robert A. McLauchlan

(57) ABSTRACT

A method operable to remove contaminants from a contaminated fluid stream is provided. The process includes receiving the fluid stream containing contaminants. A first portion of the contaminants are removed from the fluid stream with a first scrubbing vessel. A first base solution reacts with the contaminants such that the contaminants enter a contaminant solution. A remaining portion of the contaminants from the fluid stream is then removed with a at least one additional scrubbing vessel, wherein a second base solution reacts with the contaminants such that part of the remaining portion of the contaminants enter a second solution. Water content is then removed from the fluid stream with a desiccating module, wherein the desiccating module outputs a clean fluid stream.

1 Claim, 12 Drawing Sheets

US 8,226,893 B2

AUTOMATED SULFUR RECOVERY LOOP

CROSS-REFERENCE TO RELATED APPLICATIONS

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:
1. U.S. Provisional Application Ser. No. 61/075,231, entitled "HYDROGEN SULFIDE SCRUBBER," filed Jun. 24, 2008.

TECHNICAL FIELD OF THE INVENTION

The present invention relates generally to an improved method for removing contaminants from fluid streams. More specifically, the present invention relates to a method for removing sulfur and sulfur containing compounds from fluids.

BACKGROUND OF THE INVENTION

Hydrogen Sulfide ($H_2S$) is a toxic gas that places restrictions on the materials than can be used for piping and other equipment handling sour gas, as many metals are sensitive to sulfide stress cracking. The presence of $H_2S$ in gas causes lower quality burning and the production of sulfur dioxide, and so is regulated in commercially sold gas.

$H_2S$ has an offensive odor of "rotten eggs" at concentrations as low as 50 parts per billion by volume (ppbv) and is toxic at concentrations above 1000 parts per million by volume (ppmv). $H_2S$ is a health and safety hazard, and when combined with carbon dioxide ($CO_2$) and water vapor ($H_2O$), corrodes plant equipment such as boilers and piping, and can ruin power-generating equipment. Energy production is hampered if $H_2S$ gas is present. This is especially true as the cost of energy increases.

Sour gas is natural gas or any other gas containing significant amounts of $H_2S$. Natural gas is usually considered sour if there are more than 5.7 milligrams of $H_2S$ per cubic meter of natural gas, which is equivalent to approximately 4 ppm by volume.

Although the terms acid gas and sour gas are used interchangeably, strictly speaking, a sour gas is any gas that contains $H_2S$ in significant amounts, whereas an acid gas is any gas that contains significant amounts of acidic gases such as carbon dioxide ($CO_2$) or $H_2S$. Thus, carbon dioxide by itself is an acid gas but it is not a sour gas.

Before a raw natural gas containing $H_2S$ and/or carbon dioxide can be used, the raw gas must be treated to remove those impurities to acceptable levels, commonly by an amine gas treating process. The removed $H_2S$ is most often subsequently converted to by-product elemental sulfur in a Claus process.

Processes within oil refineries or natural gas processing plants that remove mercaptans and/or $H_2S$ are commonly referred to as sweetening processes because they result in products which no longer have the sour, foul odors of mercaptans and $H_2S$.

BRIEF SUMMARY OF THE INVENTION

Embodiments of the present invention are directed to systems and methods that are further described in the following description and claims. Advantages and features of embodiments of the present invention may become apparent from the description, accompanying drawings and claims.

An embodiment of the present invention provides a method to remove contaminants such as hydrogen sulfide ($H_2S$) from a contaminated fluid stream such as but not limited to natural gas. This method involves receiving the fluid stream or natural gas containing contaminants. A determination is made of the chemical composition and concentration of contaminants and hydrocarbons within the fluid stream. A first-base solution may be metered to a first scrubbing stage based on the chemical composition and concentration of the contaminants and hydrocarbons within the fluid stream. A first portion of the contaminants are removed from the fluid stream with a first scrubbing stage to produce a resultant fluid stream having reduced contaminants and a contaminant solution. Water may be desiccated or removed from the resultant fluid stream to produce a substantially contaminant-free fluid stream. The water reacts within the desiccating process to form a concentrated base solution which may be metered (with water if necessary) within the scrubbing stages to provide the first base solution.

Another embodiment provides a process for removing contaminants such as $H_2S$ from a petroleum fluid feed stream. This process involves providing a fluid feed stream such as that provided at a well or petroleum distribution network. This fluid feed stream includes or contains $H_2S$ in varying amounts. Real time monitoring may be performed to determine a chemical composition and concentration of $H_2S$ within the fluid's feed stream. This fluid feed stream may be metered to a multi-stage scrubbing system. Additionally an alkaline solution or base solution may be metered to the multi-stage scrubber as well. The alkaline solution may be metered based on the chemical composition and concentration of the first alkaline solution, the chemical composition of the fluid stream, and the concentration of $H_2S$ within the fluid feed stream. Additionally the fluid feed stream as previously stated may be metered within the multi-stage scrubber. The fluid feed stream mixes with the first alkaline solution within the first scrubber to produce a fluid stream having a reduced $H_2S$ content. A solution containing sulfide ions that was produced during the mixing of the fluid feed stream with the first alkaline solution may be removed from the first scrubber. The solution containing sulfide ions may be directed to a sulfur recovery process. A byproduct of the sulfur recovery process may be a regenerated alkaline solution which may again be metered within the multi-stage scrubber. A chemical composition and concentration of $H_2S$ within the fluid stream having a reduced $H_2S$ content may then be determined. Based on this information, the fluid stream may be metered and outputted to a distribution network. Additionally the fluid having a reduced $H_2S$ content may be processed by additional scrubbing stages or desiccated. In either case an alkaline solution may be produced as well as a substantially $H_2S$ free fluid stream. The concentrated alkaline solution may be mixed or metered with the regenerated alkaline solution and delivered within the multi-stage scrubber to produce an alkaline solution of a desired or controlled concentration in order to affect the removal of $H_2S$ from the fluid stream.

Another embodiment of the present invention provides a multi-stage scrubber operable to remove contaminants such as $H_2S$ from a petroleum fluid stream. This multi-stage scrubber includes an inlet, a first scrubbing stage, at least one additional scrubbing stage, a scrubbing solution distribution system, a process monitor system and a control system. The inlet may receive and meter the fluid stream having $H_2S$ therein. The first scrubbing stage couples to the inlet to receive the fluid feed stream. The additional in-stage scrubbing stages may be available to further process a fluid stream having $H_2S$ in either series or parallel based on the measured concentration. A scrubbing solution distribution system couples to the various scrubbing stages and meters alkaline solutions within the scrubber based on the chemical composition and concentration of the alkaline solutions and their sources and the chemical composition and concentration of $H_2S$ within the fluid stream. An outlet meters and outputs a substantially $H_2S$-free stream from the scrubbing stages. A process monitor system monitors various physical parameters such as but not limited to pressure, temperature volume flow rates fluid chemical compositions of the petroleum fluid stream, alkaline solution chemical compositions and flow rates within the multi-stage scrubber, as well as contaminant concentrations within the petroleum fluid streams. A control system couples to the process monitor to control petroleum fluid flows, alkaline solution flows, and the physical parameters within the various stages of the multi-stage scrubber based on the monitored physical parameters, fluid chemical compositions and flow rates, and alkaline solutions and chemical compositions.

Yet another embodiment provides a fluid stream compromising $H_2S$ and hydrocarbons. A first portion of the $H_2S$ is removed within an automated multi-stage $H_2S$ scrubber. This automated multi-stage $H_2S$ scrubber is operable to monitor in real time the chemical composition and concentration of $H_2S$ within the fluid stream, adjust the chemical processes within the multi-stage $H_2S$ scrubber based on the real time chemical composition and concentration of $H_2S$ within the petroleum fluid stream and produce a substantially $H_2S$-free petroleum fluid stream. This multi-stage scrubber may also monitor the $H_2S$ concentration of the substantially $H_2S$ free stream and supply this information to downstream processes such as downstream processes may be configured based on that chemical composition.

BRIEF DESCRIPTION OF THE SEVERAL VIEWS OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Figure 1:
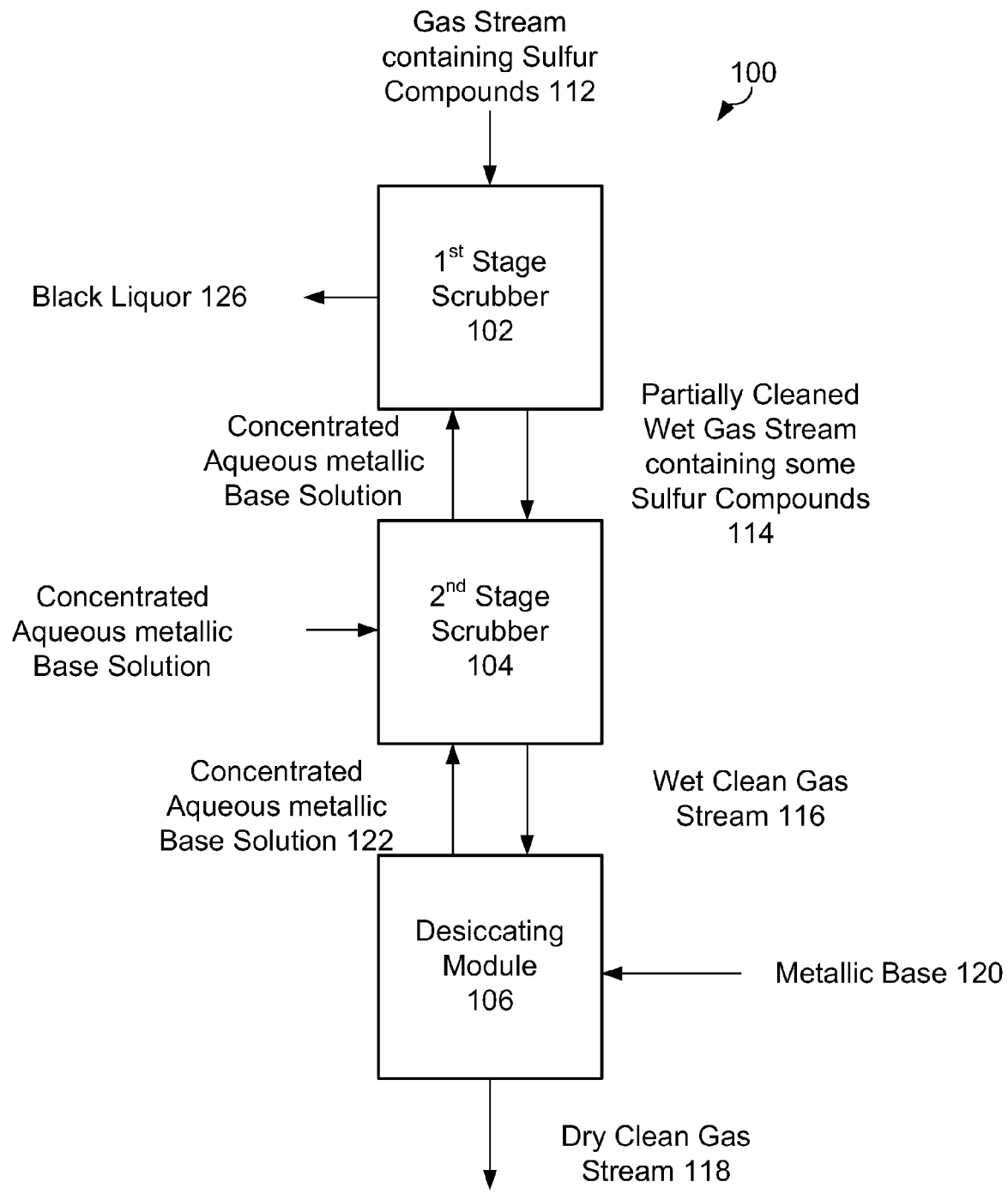
FIG. 1 provides a process flow diagram of a process operable to remove sulfur containing compounds from a gas stream in accordance with embodiments of the present invention.

Preferred embodiments of the present invention are illustrated in the FIGs., like numerals being used to refer to like and corresponding parts of the various drawings.

Embodiments of the present invention provide a scrubber or scrubbing process for removal of hydrogen sulfide ($H_2S$) gas and particulate matter, as well as other contaminates from gas streams such as natural gas or a biogas as it is produced. Embodiments may provide automated $H_2S$ removal and recovery within a closed or partially closed loop where raw materials are regenerated and recycled. Measurement and control systems allow the automated $H_2S$ removal process to efficiently operate over a wide range of variables (gas flows, contaminates, $H_2S$ concentrations etc.) The $H_2S$ may be converted to elemental sulfur or black liquor which may be sold.

Petroleum is a complex mixture of organic liquids consisting of a complex mixture of hydrocarbons of various molecular weights, plus other organic compounds. Petroleum is often referred to as crude oil and natural gas. Crude oil and natural gas vary from well to well, oilfield to oilfield, and over time in color and composition, from a pale yellow low viscosity liquid to heavy black 'treacle' consistencies. Crude oil and natural gas are extracted from beneath the earth's surface using wells and are then transported to refineries where their components are processed into refined products. These products may include but are not limited to fuels, gasoline or petrol, diesel, lubricating oil, fuel oil, bitumen, lubricating oils, waxes, asphalt, petrochemicals and pipeline quality natural gas. Natural gas from the well, while principally methane, contains quantities of other hydrocarbons—ethane, propane, butane, pentane and also carbon dioxide and water. These components are separated from the methane at a gas fractionation plant.

A refinery (distillation and gas fractionation plants) provides an organized and coordinated arrangement of manufacturing processes designed to produce physical and chemical changes in crude oil. As petroleum (crude oil and natural gas) is extracted from the ground, the extracted fluids include a mixture of hydrocarbon compounds and quantities of other materials such as oxygen, carbon dioxide, $H_2S$, nitrogen, sulfur, salts and water. These other materials may vary in volume and concentration over time. Most of these non-hydrocarbon substances are currently removed at the refineries where the petroleum is broken down into its various components, and blended into useful products. Handling toxic materials such as $H_2S$ place a burden on the refinery and the networks used to transport the petroleum. Embodiments of the present invention allow problems with $H_2S$ to be substantially addressed in the field prior to transportation to the refinery.

Sulfur and $H_2S$ content range from traces to more than 90 per cent and vary over time. Crude oil or natural gas containing appreciable quantities of sulfur it is called sour, if it contains little or no sulfur it is called sweet. $H_2S$ often results from the bacterial break down of sulfates in organic matter in the absence of oxygen, such as in swamps and sewers (anaerobic digestion). It also occurs in volcanic gases, natural gas, petroleum and some well waters.

A number of contaminants are found in crude oil. As the fractions travel through the refinery processing units, these impurities, such as $H_2S$, can damage the equipment, the catalysts and the quality of the products. There are also legal limits on the contents of some impurities, like sulfur, in products.

Hydrotreating is one way of removing many of the contaminants from many of the intermediate or final products. In the hydrotreating process, the entering feedstock is mixed with hydrogen and heated to 300-380° C. The oil combined with the hydrogen then enters a reactor loaded with a catalyst which promotes several reactions:

$$H_2 + S \rightarrow H_2S \qquad \text{eq. 1}$$

Nitrogen (N) compounds are converted to ammonia (NH3);

The $H_2S$ created is a toxic gas that needs further treatment. The usual process involves two steps:
(1) the removal of the $H_2S$ gas from the hydrocarbon stream; and
(2) the conversion of $H_2S$ to elemental S, a non-toxic and useful chemical.

In one instance solvent extraction, using an amine solution such as but not limited to diethanolamine (DEA) dissolved in water, may be applied to separate the $H_2S$ gas from the process stream. The hydrocarbon gas stream containing the $H_2S$ is bubbled through a solution of DEA under high pressure, such that the $H_2S$ gas dissolves in the DEA. The DEA and hydrogen mixture is the heated at a low pressure and the dissolved $H_2S$ is released as a concentrated gas stream which is sent for conversion into Sulfur. This process is further discussed with reference to FIG. 6.

The Claus process provides for the conversion of the concentrated $H_2S$ gas into elemental sulfur in two stages. First, part of the $H_2S$ stream is combusted in a furnace, producing sulfur dioxide ($SO_2$) water ($H_2O$) and sulfur (S) as shown in equation 2.

$$2H_2S + 2O_2 \rightarrow SO_2 + S + 2H_2O \qquad \text{eq. 2}$$

Reaction of the remainder of the $H_2S$ occurs in the presence of a catalyst. The $H_2S$ reacts with the $SO_2$ to form sulfur.

$$2H_2S + 2O_2 \rightarrow 3S + 2H_2O \qquad \text{eq. 3}$$

As the reaction products are cooled the sulfur drops out of the reaction vessel in a molten state. Sulfur can be stored and shipped in either a molten or solid state.

FIG. 1 provides a process flow diagram of a process operable to remove sulfur containing compounds from a gas stream in accordance with embodiments of the present invention. Process 100 includes a multiple stage scrubber having a first stage scrubber 102, a second stage scrubber 104 and a desiccating module 106. A gas stream containing sulfur compounds 112 may be provided to a first stage scrubber 102. This gas stream may contain $H_2S$. The first stage scrubber 102 may be an aqueous scrubber that allows the gas feed stream to interact with a first alkaline solution in order to form black liquor and a partially cleaned wet gas stream 114.

The scrubber may be a gas-liquid contactor that has as its basis an impeller-shroud mixing device or other like device known to those having skill in the art. The scrubber removes $H_2S$ from a gas stream using a regenerating scrubbing solution. Gases are routed through a scrubbing vessel (having one or more stages) where up to about 99% of the $H_2S$ is extracted with an aqueous scrubbing solution in the first stage.

The alkaline solution may be based on potassium hydroxide (KOH). The chemical compound potassium hydroxide (KOH), sometimes known as caustic potash, potassa, potash lye, and potassium hydrate, is a metallic base. It is very alkaline and is a "strong base", along with sodium hydroxide, lithium hydroxide, calcium hydroxide, barium hydroxide and strontium hydroxide. Pure potassium hydroxide is a colorless, highly hygroscopic, solid crystalline compound, having density of about 2.04 g/cm³, readily soluble in water (1 g KOH dissolves in 0.5 g water). Potassium hydroxide forms solid hydrates, namely the monohydrate $KOH.H_2O$, the dihydrate $KOH.2H_2O$, and the tetrahydrate $KOH.4H_2O$; it is used therefore as a highly intensive desiccant agent, e.g. for drying liquid amines or their solutions in indifferent, nonpolar solvents (such as hydrocarbons).

The black liquor may be processed using a sulfur recovery loop. Potash (KOH) black liquor recovery may include acidifying and causticizing steps as is done in many pulp processes. The main components of the liquor are KOH and $K_2S$. A water enclosed circulation is used. The black liquor is successively acidified and causticized to separate out deposited dregs and clear liquid. The deposited dregs can be used to prepare compound organic fertilizer containing K and Sulfur and the clear liquid can be reused to prepare black liquor in the scrubbers.

The partially cleaned wet gas stream containing some sulfur compounds may then be provided to an additional scrubbing stage such as second stage scrubber 104. Although shown here with two aqueous scrubbing stages any number of scrubbing stages may be utilized. This allows individual scrubbing stages to be optimized for the concentration of $H_2S$ gas encountered or other contaminants encountered in gas stream 112. Although these stages are shown in series, a multistage scrubber may have parallel stages that can be reconfigured based on measured conditions associated with gas stream 112. The partially cleaned wet gas stream 114 mixes with an additional alkaline solution in the second stage scrubber. The output of the second stage scrubber may be a wet, clean gas stream 116 and a concentrated alkaline solution containing sulfide ions. The alkaline solution containing sulfide ions may be supplied as a feed to the alkaline solution of the first stage scrubber 102. The wet clean gas stream may be supplied to a desiccating module or process 106. This desiccating module may use a dry metallic base 120 to desiccate the wet clean gas stream in order to produce a dry clean gas stream 118. The metallic base 120 that absorbs water may be become a concentrated aqueous metallic base solution 122 which may serve as an input to the second stage scrubber 104 in order to form an alkaline solution in that second stage scrubber. Additionally, a concentrated aqueous metallic base solution may also be received from this sulfur recovery process. The sulfur recovery process may process the black liquor in order to recover elemental sulfur and regenerate the metallic base solution used to remove sulfur compounds from the gas stream 112.

Figure 2:
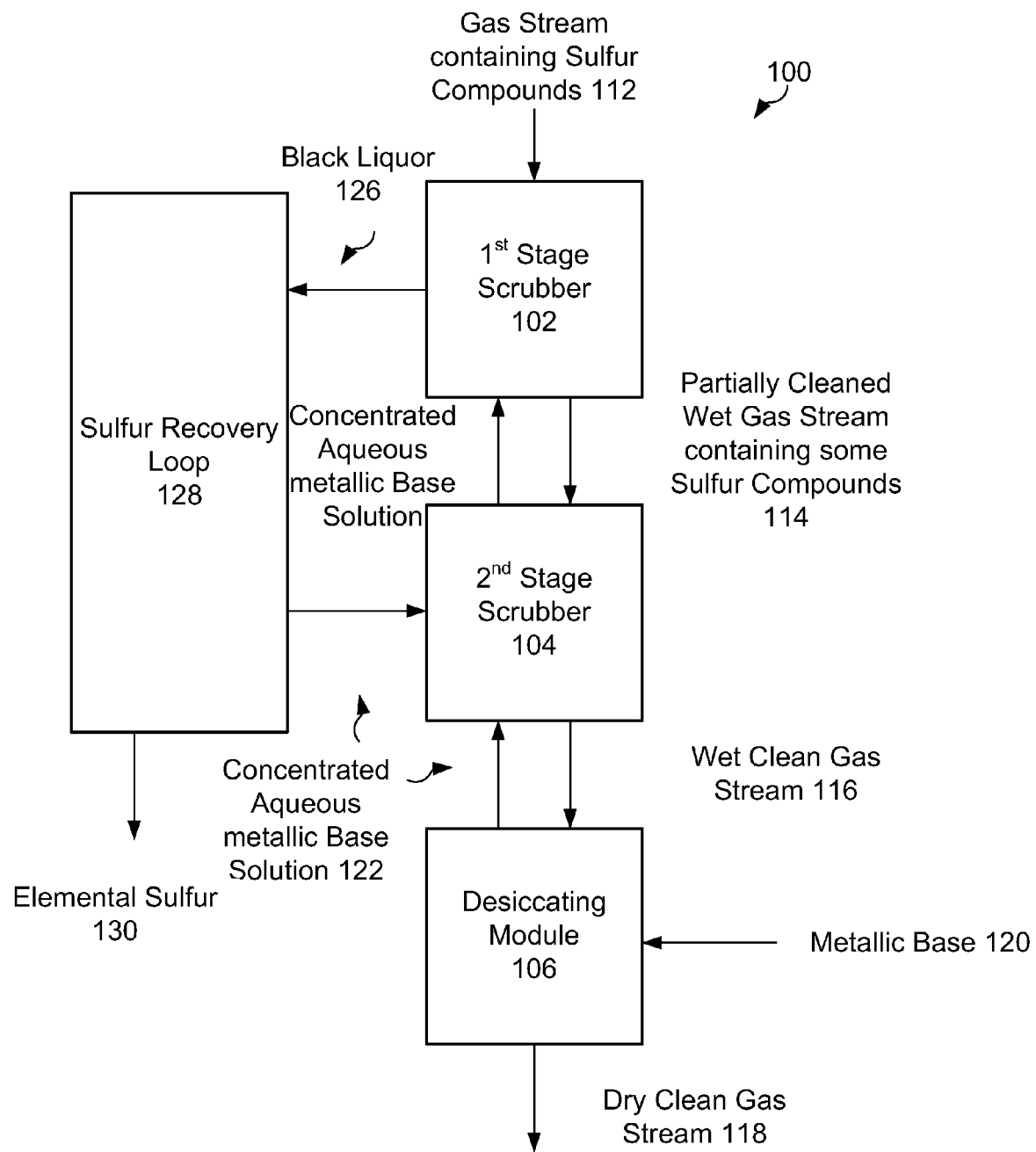
FIG. 2 provides a process flow diagram of a process operable to remove sulfur containing compounds from a gas stream in accordance with embodiments of the present invention that explicitly shows sulfur recovery loop coupled to the process.

FIG. 2 provides a process flow diagram of a process operable to remove sulfur containing compounds from a gas stream in accordance with embodiments of the present invention that explicitly shows sulfur recovery loop coupled to the process 100. In FIG. 1 the black liquor may be removed from the first stage scrubber 102 as a viable commercial product that may be sold and processed onsite or offsite to recover elemental sulfur and produce an aqueous metallic base solution. As shown here in FIG. 2 this sulfur recovery loop may be part of the process that allows the sulfur recovery loop to not only output elemental sulfur but also a concentrated aqueous metallic base solution to the second stage scrubber 104.

Figure 3:
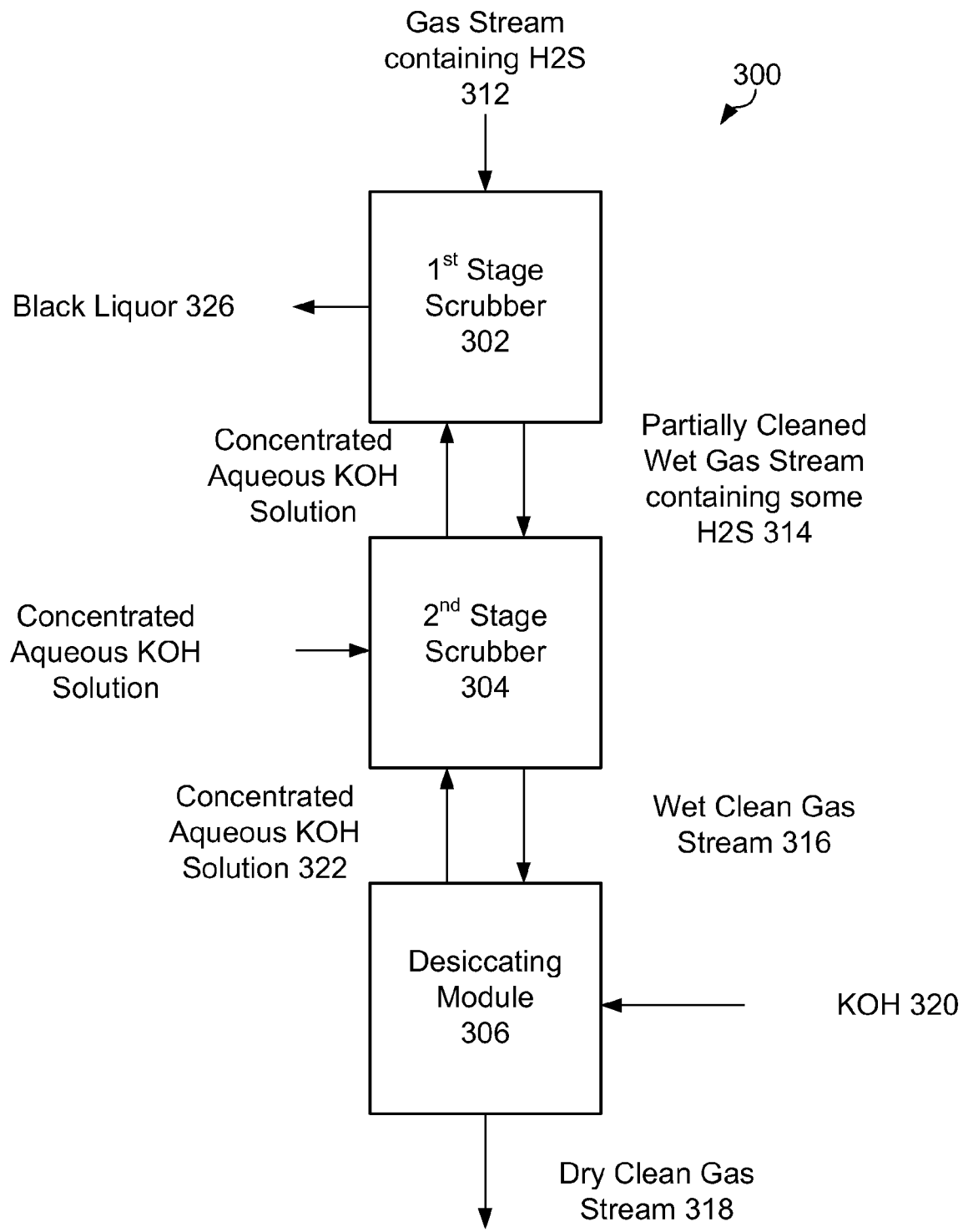
FIG. 3 provides a process flow diagram of a process operable to remove sulfur containing compounds from a gas stream with potassium hydroxide (KOH) in accordance with embodiments of the present invention.

FIG. 3 provides a process flow diagram of a process operable to remove sulfur containing compounds from a gas stream with potassium hydroxide (KOH) in accordance with embodiments of the present invention. Unlike FIG. 1, FIG. 3 specifically shows that multiple aqueous stage scrubbers may be used to remove $H_2S$ and other contaminants such as $CO_2$ from the gas stream 112. The number of stages may depend on the concentration and flow rates of contaminants within the gas stream. The concentration of the aqueous metallic base solution at the various stages may be adjusted in order to achieve the desired reaction rate. For example the first stage may have a lower concentration of the aqueous metallic base solution while later stages have higher concentrations of aqueous metallic base solution wherein as the concentration of $H_2S$ within the various stages decreases in order to achieve a desired reaction rate the concentration of the aqueous metallic base solution may be increased. As shown previously recovery loop may be used to recycle and reintroduce the aqueous metallic base solution into later stage scrubbers. Not shown would be a water makeup system that provides water to the aqueous stage scrubbers in order to ensure the desired concentrations at the specific stages.

Figure 4:
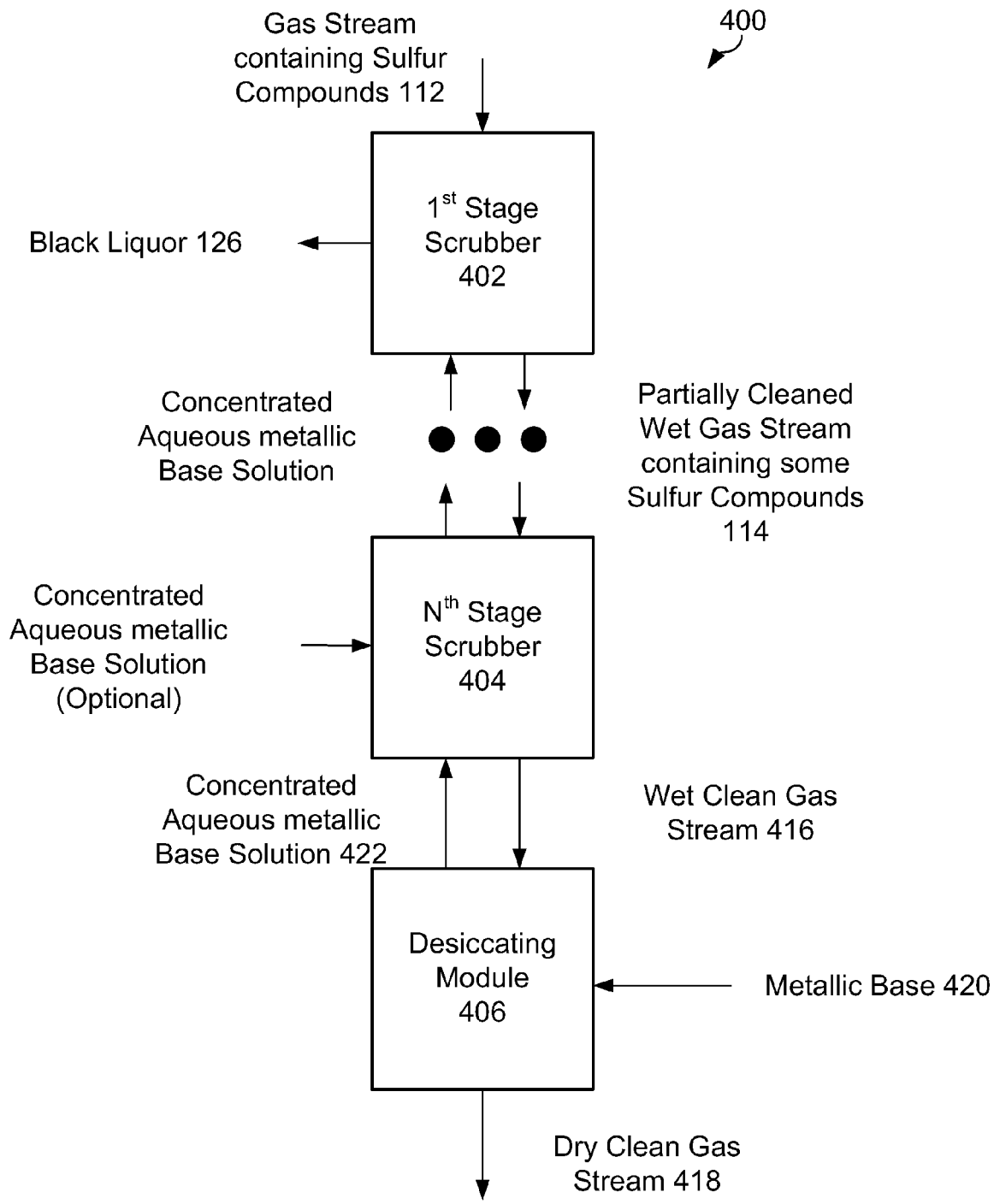
FIG. 4 provides a process flow diagram of a N-stage process operable to remove sulfur containing compounds from a gas stream in accordance with embodiments of the present invention.

FIG. 4 provides a process flow diagram of an N-stage process operable to remove sulfur containing compounds from a gas stream in accordance with embodiments of the present invention. FIG. 4 provides a process flow diagram of a variable stage process flow operable to remove sulfur-containing compounds from a gas stream in accordance with embodiments of the present invention. Unlike FIG. 1, FIG. 4 specifically shows that multiple aqueous stage scrubbers may be used to remove $H_2S$ and other contaminants such as $CO_2$ from the gas stream 112. The number of stages may depend on the concentration and flow rates of contaminants within the gas stream. The concentration of the aqueous metallic base solution at the various stages may be adjusted in order to achieve the desired reaction rate. For example the first stage may have a lower concentration of the aqueous metallic base solution while later stages have higher concentrations of aqueous metallic base solution wherein as the concentration of $H_2S$ within the various stages decreases in order to achieve a desired reaction rate the concentration of the aqueous metallic base solution may be increased. As shown previously recovery loop may be used to recycle and reintroduce the aqueous metallic base solution into later stage scrubbers. Not shown would be a water makeup system that provides water to the aqueous stage scrubbers in order to ensure the desired concentrations at the specific stages.

Figure 5:
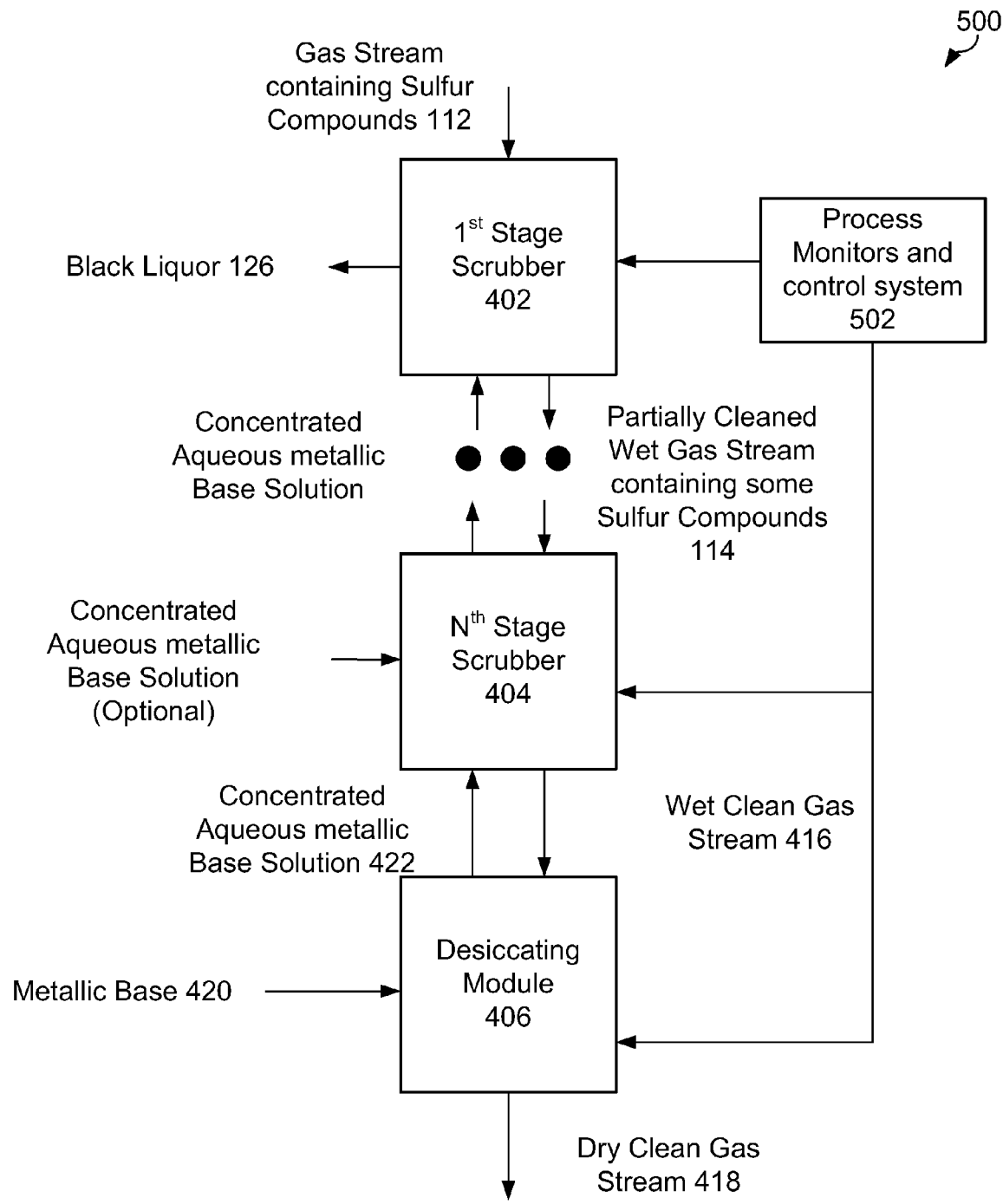
FIG. 5 provides a process flow diagram of an N-stage process operable to monitor various process parameters and optimize processes to remove sulfur containing compounds from a gas stream in accordance with embodiments of the present invention.

FIG. 5 provides a process flow diagram of an N-stage process operable to monitor various process parameters and optimize processes to remove sulfur containing compounds from a gas stream in accordance with embodiments of the present invention. A process monitoring and control system 502 may be coupled to and control the flow of concentrated aqueous metallic base solutions to the various stages in order to ensure the desired reaction rates. Additionally, the Process monitor and control system may monitor and control the chemical composition, pressure, temperature, flow rate, and volume of all fluid streams both to and within the various reactors and processing modules within the process.

FIG. 5 specifically adds process monitors 502 which may monitor (in real time or specified intervals) the chemical composition, pressure, temperature, gas concentrations and aqueous concentrations of various components within the process. For example gas monitors 502 may provide spectroscopic monitoring of the incoming gas stream 112 to identify the concentration of $H_2S$ within the gas stream as well as any other contaminant components within the gas stream. This monitoring may be done at various stages within the process flow such that flow rates, chemical concentrations, pressures and temperatures may be varied in order to achieve the desired dry clean gas. Additionally stages may be bypassed when not needed. This may be due to a varying concentration of contaminants in the feed stream gas stream 112. Thus the present invention allows by dynamically monitoring the concentration of components within solution and gas the processes may be optimized to extract the contaminants.

The $H_2S$ scrubber may be located following a gas/liquid separator and before an optional dehydration process that may be incorporated within the scrubbing system as shown in the FIGs. The level of $H_2S$ on the various $H_2S$ scrubber stage outputs depends on several variables including but not limited to inlet $H_2S$ (PPM), inlet mercaptan concentration (ppm), gas flow rate (MMscfd), inlet pressure (psig), relative humidity, reactor dimensions, and gas temperature.

As flow conditions vary greatly over location and time, embodiments of the present invention apply process monitors that may continually monitor the above identified variables. Process conditions and chemical concentrations may then be metered or controlled to optimize reaction rates. This prevents problems associated with prior solutions where operators injected large amounts of chemicals to cover peak production periods and spikes in input $H_2S$ concentrations. This prior solution required over-injection, wasted money and failed to optimize process conditions for given contamination levels.

Embodiments of the present invention provide improved effectiveness of the chemical injection methods by controlling proper dispersion of the proper amount and concentration of chemicals into the fluid stream with and sufficient concentration and contact time. This controlled injection and process monitoring reduces opportunities for solidification that cause blockages in pipes and equipment and foaming.

Foaming occurs when hydrocarbons condense in the liquid or as a result of variations in flow rate and pressure. Foaming causes carry over of the liquid which can affect downstream processes. To prevent foaming, defoaming agents are introduced. Continuous monitoring and control of chemical concentrations and liquid levels may prevent foaming.

Figure 6:
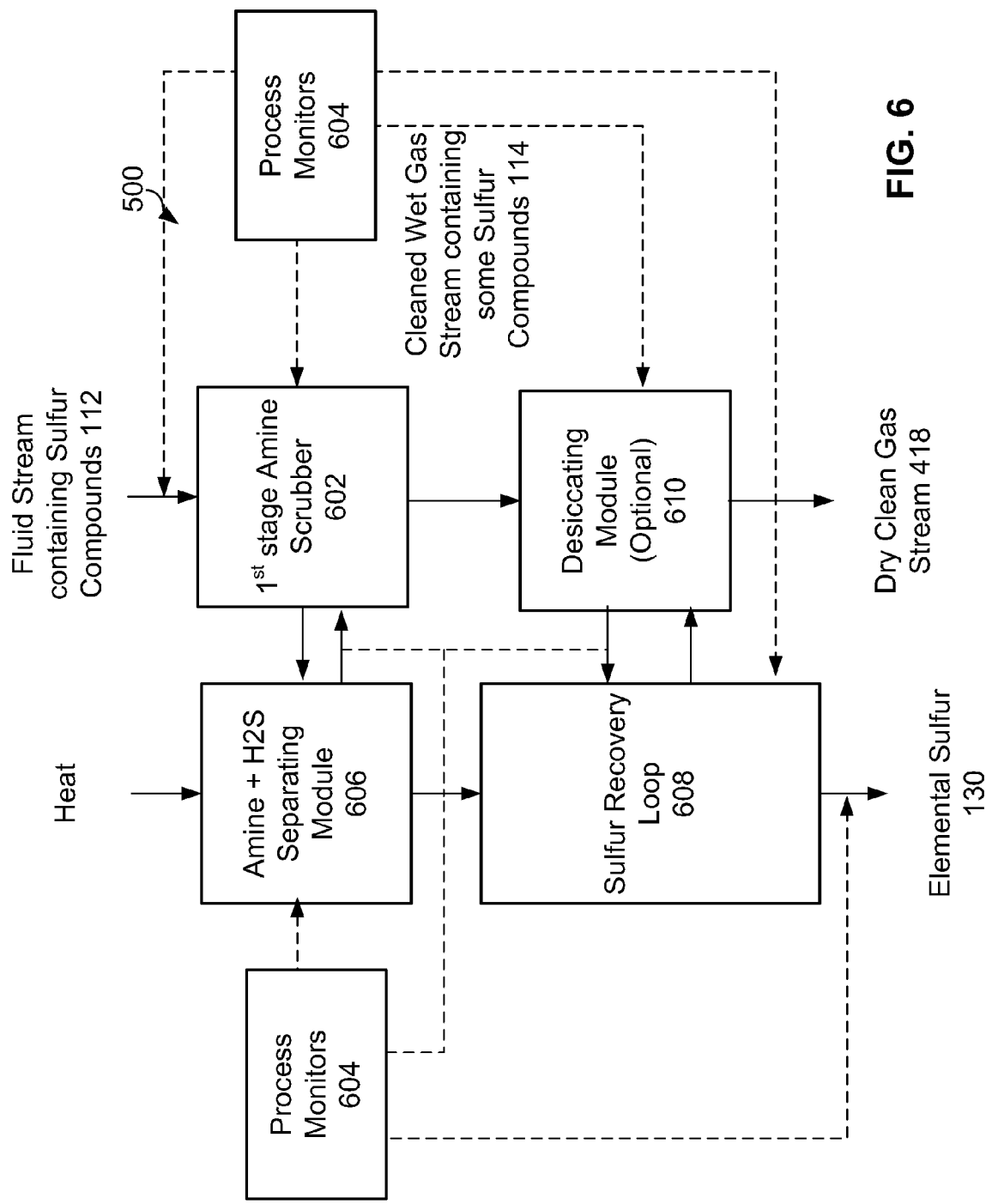
FIG. 6 provides an automated and controlled process to remove sulfur-containing compounds from a fluid stream in accordance with embodiments of the present invention.

FIG. 6 provides an automated and controlled process to remove sulfur-containing compounds from a fluid stream in accordance with embodiments of the present invention. FIG. 6 applies the process monitoring and control systems described previously to an Amine scrubbing process. Process 600 includes one or more amine scrubbing stages 602, multiple process monitors 604, and amine and $H_2S$ separating module 606, a sulfur recovery loop 608 and a desiccating module 610. A fluid stream containing sulfur compounds 112 may be provided to a first stage amine scrubber 602 where an amine solution such as DEA dissolved in water may be applied to separate the $H_2S$ gas from the fluid stream. The amine and $H_2S$ are directed to a separating module 606 while the cleaned fluid stream 612 may be directed to an optional desiccating module 610. The separating module 606 may apply heat to the amine and $H_2S$ solution or mixture such that dissolved $H_2S$ is released as a concentrated $H_2S$ gas stream which may be supplied to the sulfur recovery loop 608. The regenerated amine may be redirected to the first stage amine scrubber 602.

Sulfur recovery loop 608 may use one of many processes to recover elemental sulfur from the $H_2S$ gas. This may be done using a Claus process, an iron-based process, catalyst based, SANS based or base metal process such as but not limited to those discussed in this application. Optional desiccating module 610 may be used to remove water from the substantially cleaned fluid exiting the amine scrubbing stages 602 in order to produce a dry clean fluid stream 614. Process monitor 604 may provide continuous process monitoring of the chemical composition of various streams and points in the action this allows the chemical reactions in the various stages to be optimized by controlling concentrations, pressure, temperature and other variables known to those having skill in the art. For example the fluid stream containing sulfur compounds 112 may vary greatly thus the concentration of amine and the amount of amine solution in the scrubber may vary additionally other stages may be placed online or offline such as an iron-based scrubbing stage or an alkaline metal-based scrubbing stage depending on the concentration. By monitoring the amine concentration of the solution within Scrubber 602 in equality of the amine within the Scrubber 602 the need for makeup amine may be closely monitored and allow remote monitoring of the status of the raw materials used to remove sulfur compounds. Similarly the sulfur recovery loop may be monitored for the amount of $H_2S$ gas being processed and thus the amount of feedstock required to remove the $H_2S$.

A polyvalent metal compound such iron (Fe) may be used in a solid or aqueous form as a scrubbing agent to remove $H_2S$ from the fluid stream as well. This iron may in one embodiment take the form of $Fe_2O_3$ and/or $Fe_3O_4$. Polyvalent metal compounds such as $Fe_2O_3$ and/or $Fe_3O_4$ may be provided as a substantially uniform and granular material. This polyvalent metal compound is both stable and non-pyrophoric and may react with $H_2S$ to form another stable compound, an iron sulfide with the formula $FeS_2$. Such a process may be selective to $H_2S$, and yield little or no undesirable byproducts. Furthermore, the substantially uniform shape and size of some polyvalent metal compounds material may prevent channeling.

Figure 7:
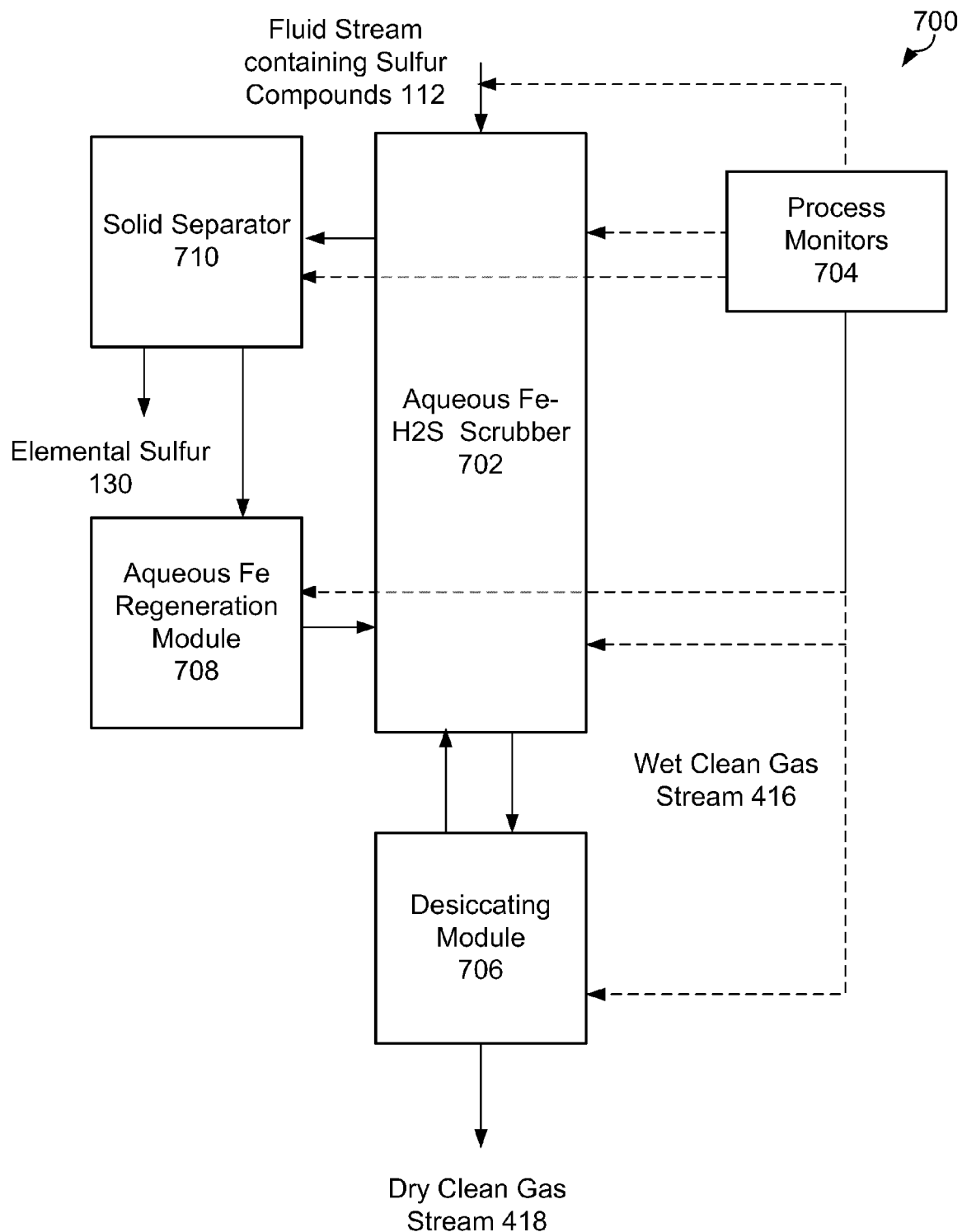
FIG. 7 provides a block diagram of an aqueous iron scrubber in accordance with the embodiments of the present invention.

FIG. 7 provides a block diagram of an aqueous iron scrubber in accordance with the embodiments of the present invention. The fluid stream containing process 700 includes an aqueous iron $H_2S$ scrubber 702 which may be one or more stages, multiple process monitors 704, Control system 705, optional desiccating module 706, aqueous iron regeneration module 708, and a solid separator 710. The process may work at both ambient temperature and pressure although the chemical process may be controlled by adjusting both temperature and pressure as well as concentration of various chemical components and solutions such as the iron oxide solution concentrations.

Aqueous $H_2S$ scrubber 702 creates a bath of reacted water that fluid stream 112 flows through. This may flow through the bottom of the scrubber. $H_2S$ in the fluid stream may be absorbed by the reacted water and may be subsequently converted in to elemental sulfur and iron sulfide. Sulfur generated may be removed from the aqueous solution by filtration or a solid separator 710. The reacted water may then again be regenerated and passed through the scrubber for further cleaning of sour gas. $H_2S$ when dissolved in the aqueous solution is ionized to hydrogen and sulfur. The sulfur ions can be oxidized by polyvalent metal ions such as but not limited to iron which can exist in both a ferric and ferrous state. The sulfur ion contacts the polyvalent metal ion to become oxidized where it is oxidized to elemental sulfur and precipitated. The chemical reaction is shown in Equation Four. These metal ions may be later oxidized to ferric ions by reaction with atmospheric oxygen in the aqueous iron regeneration module 708. Embodiments of the present invention provide a process that is highly selective to $H_2S$. The $H_2S$ may be converted to elemental sulfur which has commercial value. Process monitor 704 allows the concentrations of iron in the scrubber to be adjusted based on incoming fluid streams.

Figure 8:
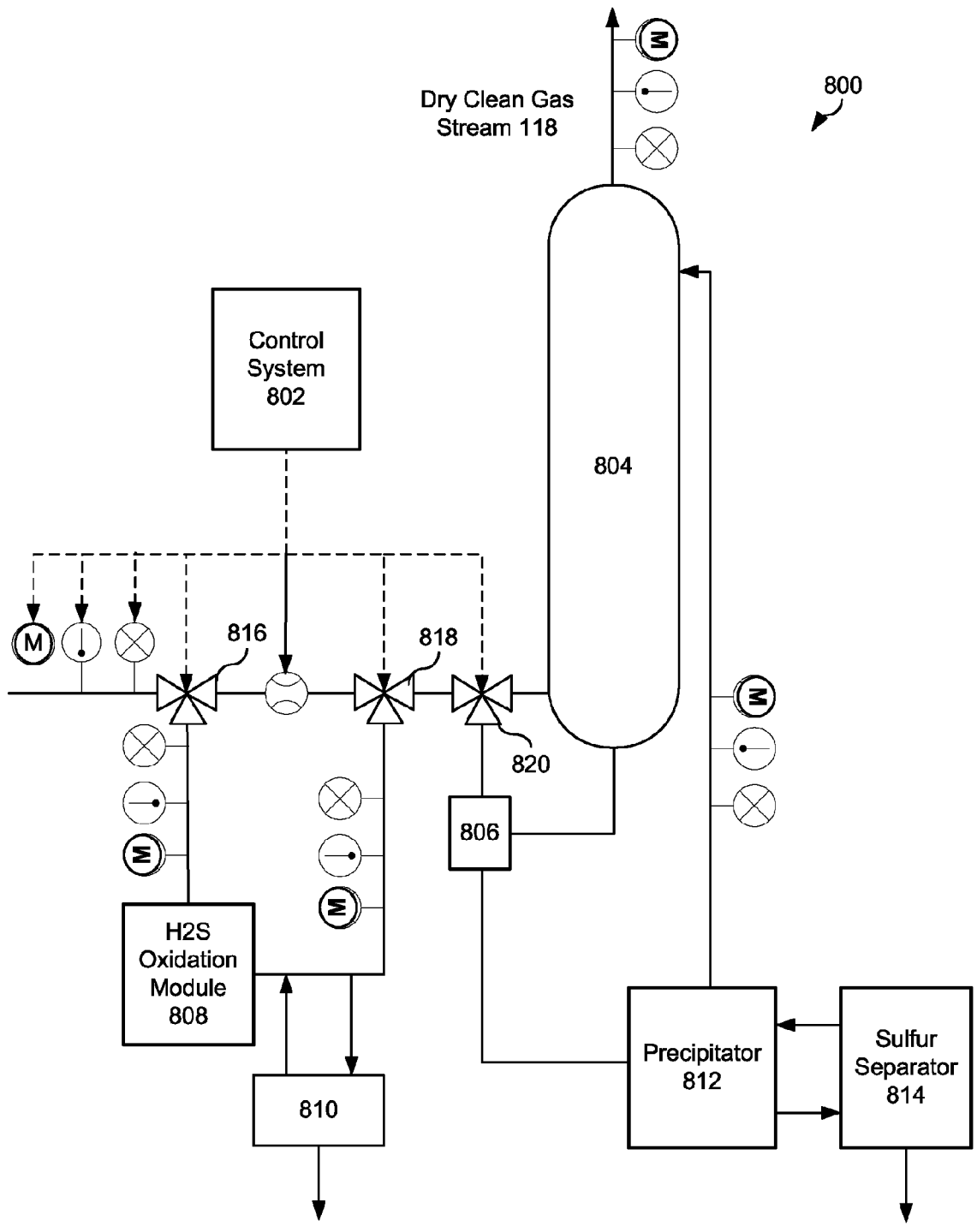
FIG. 8 provides a block diagram of a $H_2S$ removal process in accordance with embodiments of the present invention.

FIG. 8 provides a block diagram of a $H_2S$ removal process in accordance with embodiments of the present invention. This process may be applied to sour natural gas at well heads to remove $H_2S$ and convert the $H_2S$ to elemental sulfur via the liquid-phase modified Claus reaction. The process provide by embodiments of the present invention may not be affected by contaminants such as but not limited to carbon dioxide, oxygen, mercaptans, and heavy hydrocarbons.

$H_2S$ may be removed from the sour gas in a conventional tray absorber 804. The $H_2S$ reacts with dissolved sulfur dioxide ($SO_2$) to produce dissolved elemental sulfur, which has a high solubility in a sulfur-amine nonaqueous sorbent (SANS). Operating conditions within the absorber are monitored and controlled in real time as discussed previously such that $H_2S$ converts to polysulfides which are nonvolatile but which can be readily transformed to sulfur by reaction with an oxidizing agent. The nonaqueous liquid sorbing liquor (or scrubbing solution) comprises an organic solvent for elemental sulfur, dissolved elemental sulfur, an organic base which drives the reaction converting $H_2S$ sorbed by the liquor to a nonvolatile polysulfide which is soluble in the sorbing liquor, and an organic solubilizing agent which prevents the formation of polysulfide oil-which can tend to separate into a separate viscous liquid layer if allowed to form. The solubilizing agent is typically selected from the group consisting of aromatic alcohols, ethers and other polar organic compounds including sulfolane, propylene carbonate, and tributyl phosphate, and mixtures thereof. The sorbing liquor is preferably essentially water insoluble as this offers advantages where water may be condensed in the process. It is also preferable for water to be essentially insoluble in the solvent. The nonaqueous solvent is typically selected from the group consisting of alkyl-substituted naphthalenes, diaryl alkanes including phenylxylyl ethanes such as phenyl-o-xylylethane, phenyl tolyl ethanes, phenyl naphthyl ethanes, phenyl aryl alkanes, dibenzyl ether, diphenyl ether, partially hydrogenated terphenyls, partially hydrogenated diphenyl ethanes, partially hydrogenated naphthalenes, and mixtures thereof. In order to obtain a measurable conversion of sulfur and $H_2S$ to polysulfides, the base added to the solvent must be sufficiently strong and have sufficient concentration to drive the reaction of sulfur and $H_2S$ to form polysulfides. Most tertiary amines are suitable bases for this use. It should be noted that while the solvent utilized in the process requires the addition of a base to promote the reaction of sulfur and $H_2S$ to form polysulfides, the base and the solvent may be the same compound.

A $H_2S$ rich solution passes from the absorber passes to a flash tank 806. After the flash step, the solution flows to a precipitator 812 where solid elemental sulfur precipitates. An $H_2S$ lean SANS solution flows from the precipitator 812 back to the absorber following a heat treatment to raise the solution temperature back to the circulating temperature and ensures that all elemental sulfur is dissolved in the solution.

Because the elemental sulfur stays dissolved in the solution, there are no solids in the liquid circulated to the absorber. This feature helps to eliminate the root cause of foaming, plugging, and other operational problems that have plagued other processes.

The precipitator/filter 812 is the only place where sulfur solids exist within the process, and sulfur solids are removed by a filter system. The produced sulfur may used in agriculture, disposed of as non-hazardous waste, or recycled into liquid $SO_2$. $SO_2$ may be added to the solution in one of three ways: (1) liquid $SO_2$ may be metered into the system; (2) a portion of the product sulfur may be burned and the resulting $SO_2$ absorbed into the SANS solution in a small separate contactor; and (3) a portion of the inlet stream can be burned and the $SO_2$ absorbed in a separate contactor.

Monitoring and control system 802 may monitor flow conditions, chemical compositions, pressure, temperature, feed stock properties, fluid inlet and outlet properties. This information may be used to control the pressure, temperature, volume, flow rates and concentration of reactants in various reactors and processing modules of the automated $H_2S$ removal systems described above. Additionally the monitoring and control system may be communicatively coupled to a larger system to monitor conditions such that onsite measurements by field personnel are reduced. Also, feedstock delivery can be optimized by monitoring the feedstock and process conditions from a remote site. This allows delivery of feedstock's (i.e. scrubbing solutions and solids) to be optimized for a group of wells.

The monitoring and control system can take the form of an entirely hardware embodiment, an entirely software embodiment or an embodiment containing both hardware and software elements. In a preferred embodiment, the invention is implemented in software, which includes but is not limited to firmware, resident software, microcode, etc. The monitoring and control system may include a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
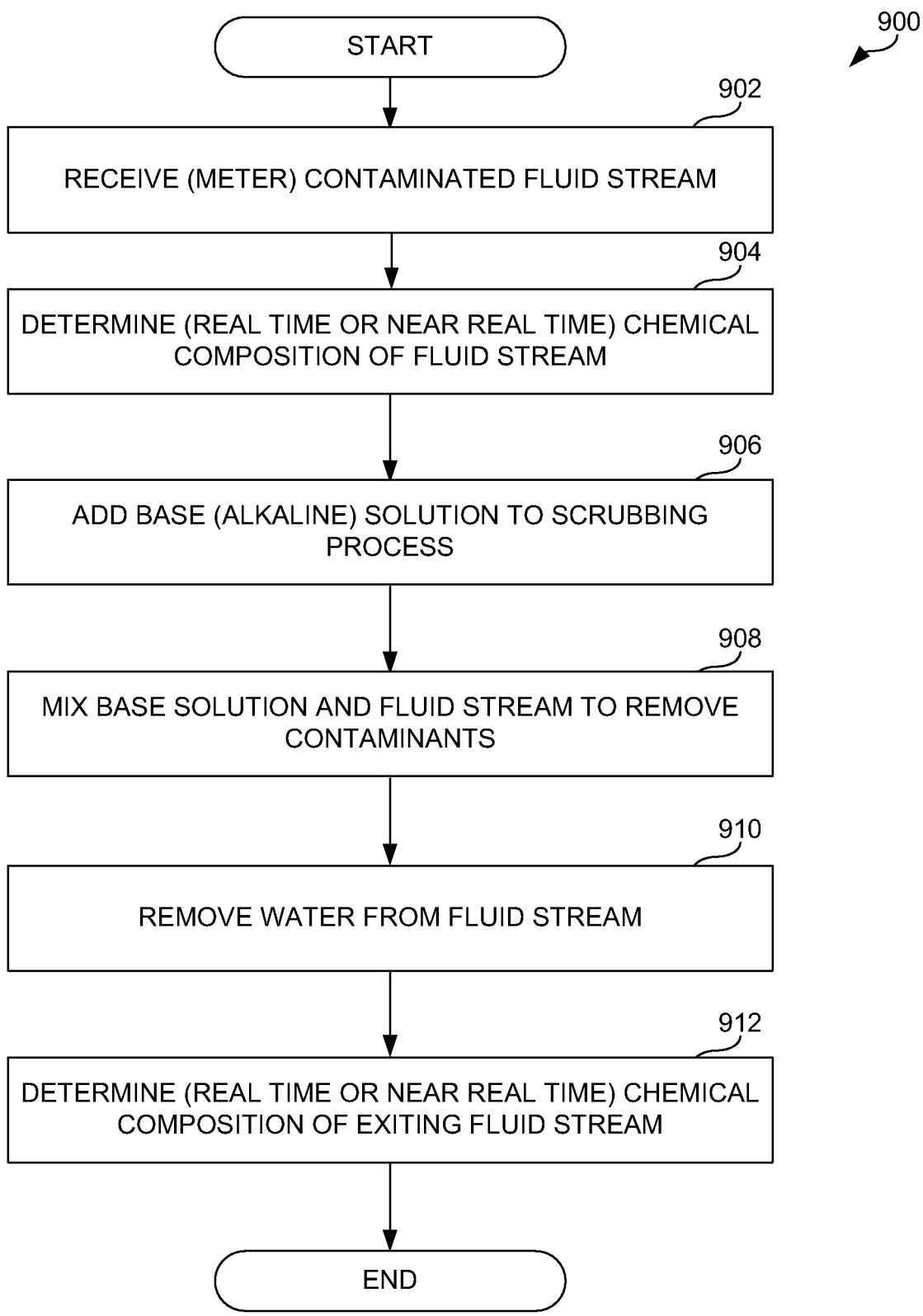
FIG. 9 provides a logic flow diagram of a method to remove contaminants from a contaminated fluid stream.

FIG. 9 provides a logic flow diagram of a method to remove contaminants from a contaminated fluid stream. Operations 900 begin in Step 902 when the fluid stream containing contaminants is received. In Step 904 the chemical composition and concentration of contaminants within the fluid stream may be determined. Based on the chemical composition and concentration of contaminants determined in Step 904, a first base solution may be added to a first scrubbing stage in Step 906. This first base solution dispersed within the scrubbing stage removes a portion of the contaminants from the fluid stream and these contaminants enter a contaminant solution in Step 908. Water may be removed or desiccated from the fluid stream with a desiccating module to provide a clean substantially contaminant free fluid stream in Step 910. The water reacts with the desiccating media to form a concentrated base solution.

Embodiments of the present invention may further include determining the chemical composition and concentration of contaminants within the fluid stream after removing the first portion of the contaminants. The concentrated base solution may be metered to a second scrubbing stage based on the chemical composition and concentration of the contaminants within the fluid stream after removing the first portion of the contaminants. This allows a second or additional scrubbing stage to remove a remaining portion of the contaminants. All fluids and solutions may have their chemical composition and constituent concentrations determined such that they may be metered to the various stages within the scrubber to optimize or configure the reaction rates to remove contaminants from the fluid stream. These contaminants may be sulfur containing compounds such as $H_2S$ and the base or alkaline solutions may be a potassium hydroxide solution, aqueous iron solution, non-aqueous solutions, SANS solutions or other alkaline solutions known to those having skill in the art.

Figure 10:
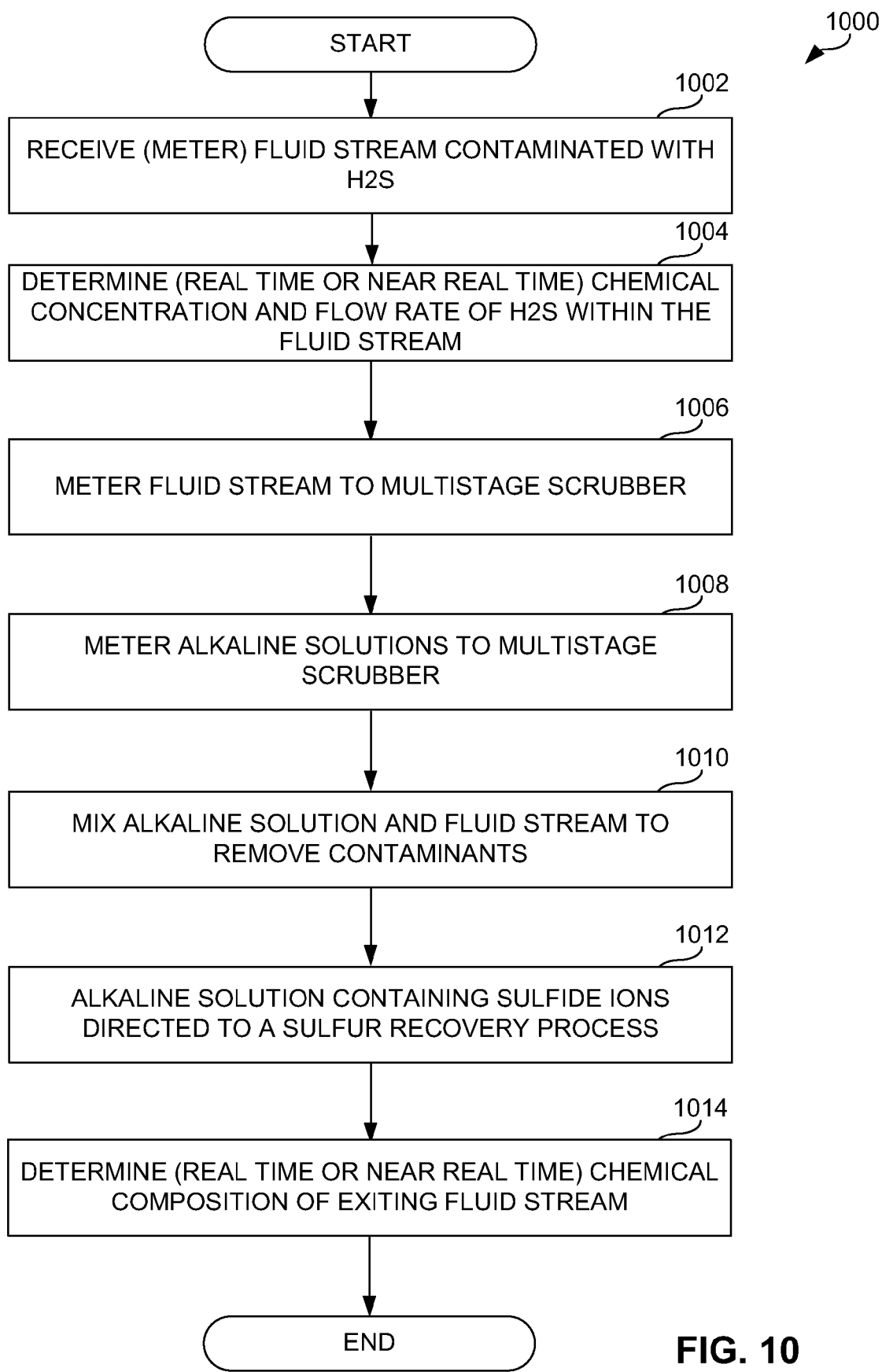
FIG. 10 provides a process flow diagram of a process operable to remove contaminants from a contaminated fluid stream, such as a petroleum stream, in accordance with embodiments of the present invention.

FIG. 10 provides a process flow diagram of a process operable to remove contaminants from a contaminated fluid stream, such as a petroleum stream, in accordance with embodiments of the present invention. Operations of 1000 begin with Step 1002 when a fluid feed stream comprising $H_2S$ is provided as an input to the system. A chemical composition concentration of $H_2S$ within the fluid feed stream may be determined in Step 1004. The fluid feed stream may be metered to a multi-stage scrubber in Step 1006. Additionally in Step 1008 the alkaline solution may be metered to the multi-stage scrubber. The alkaline solution may be metered based on the chemical composition and concentration of the alkaline solution as well as the concentration of $H_2S$ in other contaminants or constituents of the fluid stream. The fluid feed stream and the alkaline solution mix within the scrubber to produce a fluid stream having a reduced $H_2S$ content. An alkaline solution containing sulfide ions may be removed from the scrubber and directed to a sulfur recovery process in Step 1012 where a by product of the sulfur recovery process is a regenerated alkaline solution. In later stages of a multi-stage scrubber an alkaline solution containing sulfide ions may be directed upstream to a previous stage of the multi-stage scrubber to act as an alkaline solution to remove additional $H_2S$. In Step 1014 a chemical composition concentration of $H_2S$ within the fluid stream having a reduced $H_2S$ content may be determined. The fluid stream having a reduced $H_2S$ content can then be outputted to a fluid network such as a natural gas pipeline for further processing. By determining real time chemical composition and concentration of $H_2S$ within the substantially $H_2S$ free fluid stream outputted by the multi-stage scrubber this information may be supplied in real time to downstream processes when the downstream processes, i.e., refinery processes may be configured or optimized based on the real time chemical composition and concentration of $H_2S$ within the substantially $H_2S$ free fluid stream. By monitoring the $H_2S$ concentration in real time over the life of a refinery or transportation network the sulfide corrosive effects on the transportation network such as sulfide embitterment of steel may be calculated and proactively tracked such that components may be replaced prior to failure based on actual $H_2S$ exposure as opposed to an arbitrary time chosen based on peak exposures.

Figure 11:
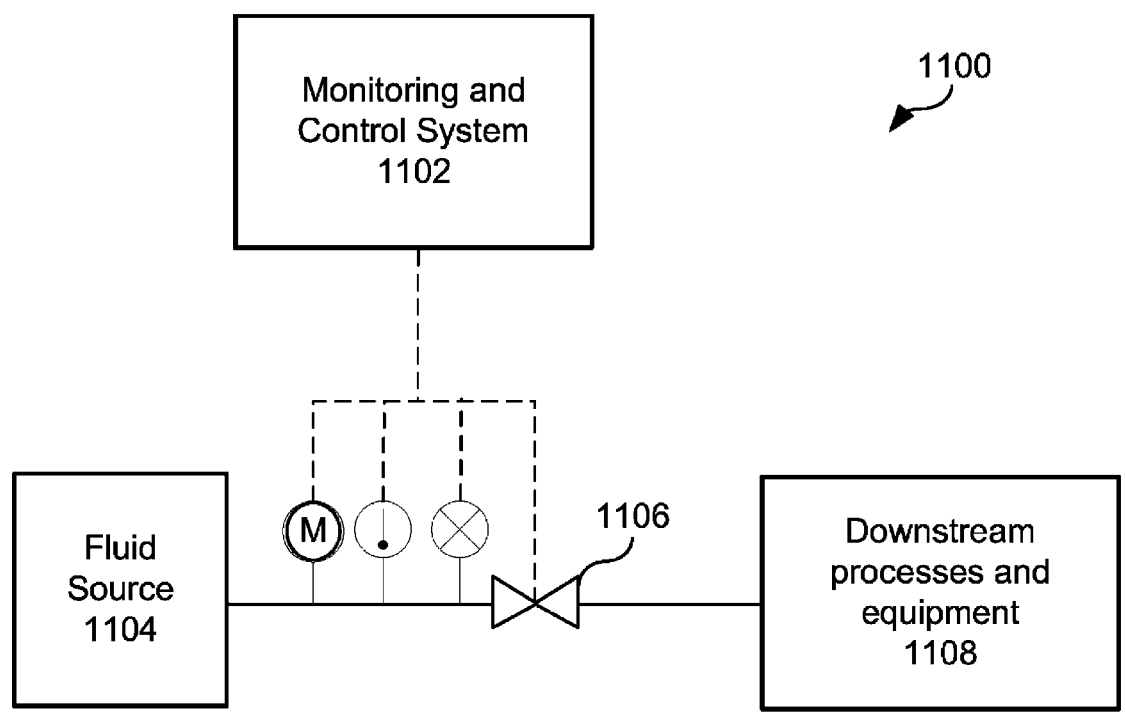
FIG. 11 provides a block diagram of a contaminate control system in accordance with embodiments of the present invention.

FIG. 11 provides a block diagram of a contaminate control system in accordance with embodiments of the present invention. This contaminate control system includes a monitoring and control system 1102, a fluid source 1104, a real-time or near real-time analytical equipment 1110, an isolation valve 1106, and downstream processes and equipment 1108. Fluid source 1104 may be a petroleum stream of crude oil or natural gas as provided by a well or within a refinery. Other embodiments may sample a water stream or other fluid source 1104. This fluid source may be located within a refinery or chemical processing plant. Monitoring and control system 1102 is coupled to real-time or near real time analytical equipment such as an inline spectroscopy tool 1110. This equipment may be used to provide real-time monitoring of a fluid stream within fluid source 1104. This monitoring equipment is able to accurately and in real-time determine the chemical composition and concentration of contaminants within the fluid source, as well as the chemical composition of constituent components. Additionally the monitoring control system may monitor the flow rate, pressure, temperature and other parameters associated with the fluid source. The monitoring and control system may compare contaminate levels to predetermined threshold levels. When the predetermined or threshold levels compare unfavorably, monitoring and control system 1102 may throttle or secure flow by adjusting or closing valve 1106. This allows downstream process and equipment 1108 to be protected from contaminate levels within fluid source 1104. This provides a significant advantage over existing systems. Real-time chemical composition and analysis such as that provided by an inline spectroscopy monitoring tool may be used to isolate downstream and processes and equipment from potentially harmful contaminates. Additionally, this may allow the downstream processes and equipment to be reconfigured, manually or automatically, in order to handle a process contaminant. The monitoring and control system 1102 may couple to downstream processes and equipment and insure that they are properly configured to handle contaminates and the chemical composition of the fluid stream prior to opening or returning the fluid source of 1104 to service. This may prevent the unnecessary application of downstream processes where not needed.

Figure 12:
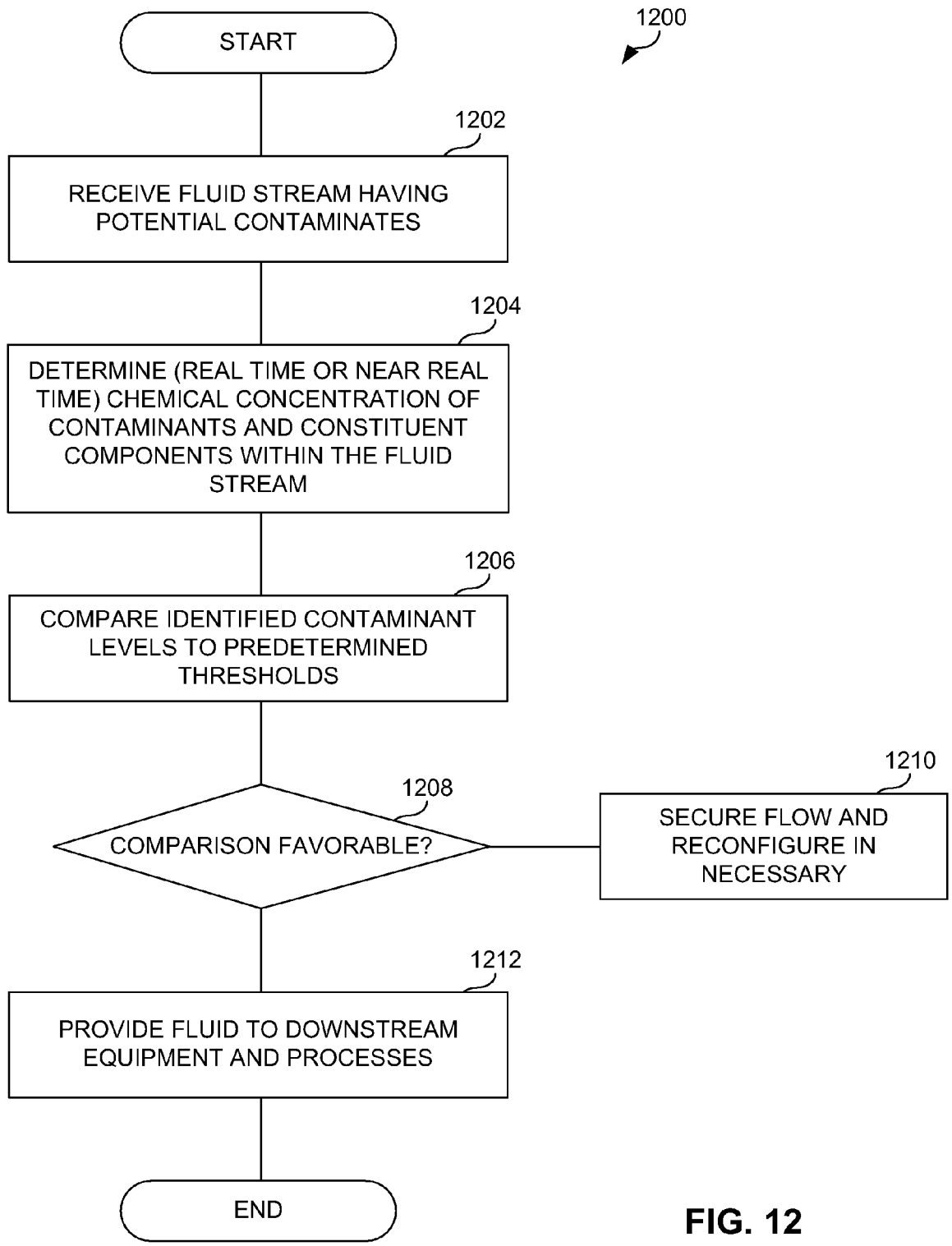
FIG. 12 provides a logic flow diagram illustrating a process of securing or adjusting fluid flow based on real-time measured contaminate levels in accordance with embodiments of the present invention.

FIG. 12 provides a logic flow diagram illustrating a process of securing or adjusting fluid flow based on real-time measured contaminate levels in accordance with embodiments of the present invention. Operations 1200 begin in step 1202 when a fluid stream having potential contaminants is received. In step 1204, chemical concentration of contaminants and constituent components within the fluid stream are determined in real-time or new real-time using equipment such as in-line spectroscopy monitoring tools. These determined contaminate levels may be compared to predetermined thresholds in Step 1206. When the comparison is favorable at decision point 1208, the fluid may be provided to downstream equipment and processes in step 1212. However, when the comparison is unfavorable, flow may be secured and reconfigured in step 1210. Additionally, downstream processes and equipment may be reconfigured in order to handle the contaminates or lack thereof in the most economical manner possible.

In summary, a method operable to remove contaminants from a contaminated gas stream is provided. The process includes receiving the gas stream containing contaminants. A first portion of the contaminants are removed from the gas stream with a first scrubbing vessel. A first base solution reacts with the contaminants such that the contaminants enter a contaminant solution. A remaining portion of the contaminants from the gas stream is then removed with a at least one additional scrubbing vessel, wherein a second base solution reacts with the contaminants such that part of the remaining portion of the contaminants enter a second solution. Water content is then removed from the gas stream with a desiccating module, wherein the desiccating module outputs a clean gas stream.

The processes described above in addition to being applicable to $H_2S$ scrubbing of petroleum fluid streams may also provide a $H_2S$ scrubber that may be used on synthetic gas streams, power plant effluent or coal effluent streams, geo thermal water streams wherein water is heavily contaminated with $H_2S$, mining operations where $H_2S$ is produced while extracting metals from various ores.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A multistage scrubber comprising:
   an inlet operable to receive and meter a fluid feed stream comprising hydrogen sulfide ($H_2S$);
   a first scrubbing stage coupled to the inlet operable to receive the fluid feed stream comprising $H_2S$;
   at least one additional scrubbing stage operable to further process the fluid feed stream comprising $H_2S$;
   a scrubbing solution distribution system coupled to the first scrubbing stage and the at least one additional scrubbing stage, the scrubbing solution distribution system operable to meter alkaline solutions within the scrubber based on:
   the chemical composition and concentration of the alkaline solutions,
   and the chemical composition and concentration of $H_2S$ within the fluid stream;
   an outlet operable to meter and output a substantially $H_2S$ free stream from the scrubbing stages;
   a process monitor system operable to monitor physical parameters, fluid chemical compositions and flow rates, and alkaline solution chemical compositions and flow rates at a plurality of points within the multistage scrubber; and
   a control system coupled to the process monitor system operable to control fluid flows, alkaline solution flows and physical parameters within the multistage scrubber based on the monitor physical parameters, fluid chemical compositions and flow rates, and alkaline solution chemical compositions.

* * * * *